Feb. 10, 1970 E. A. ROSS 3,495,025
WOVEN ELECTRICAL CABLE STRUCTURE AND METHOD
Filed Dec. 7, 1967
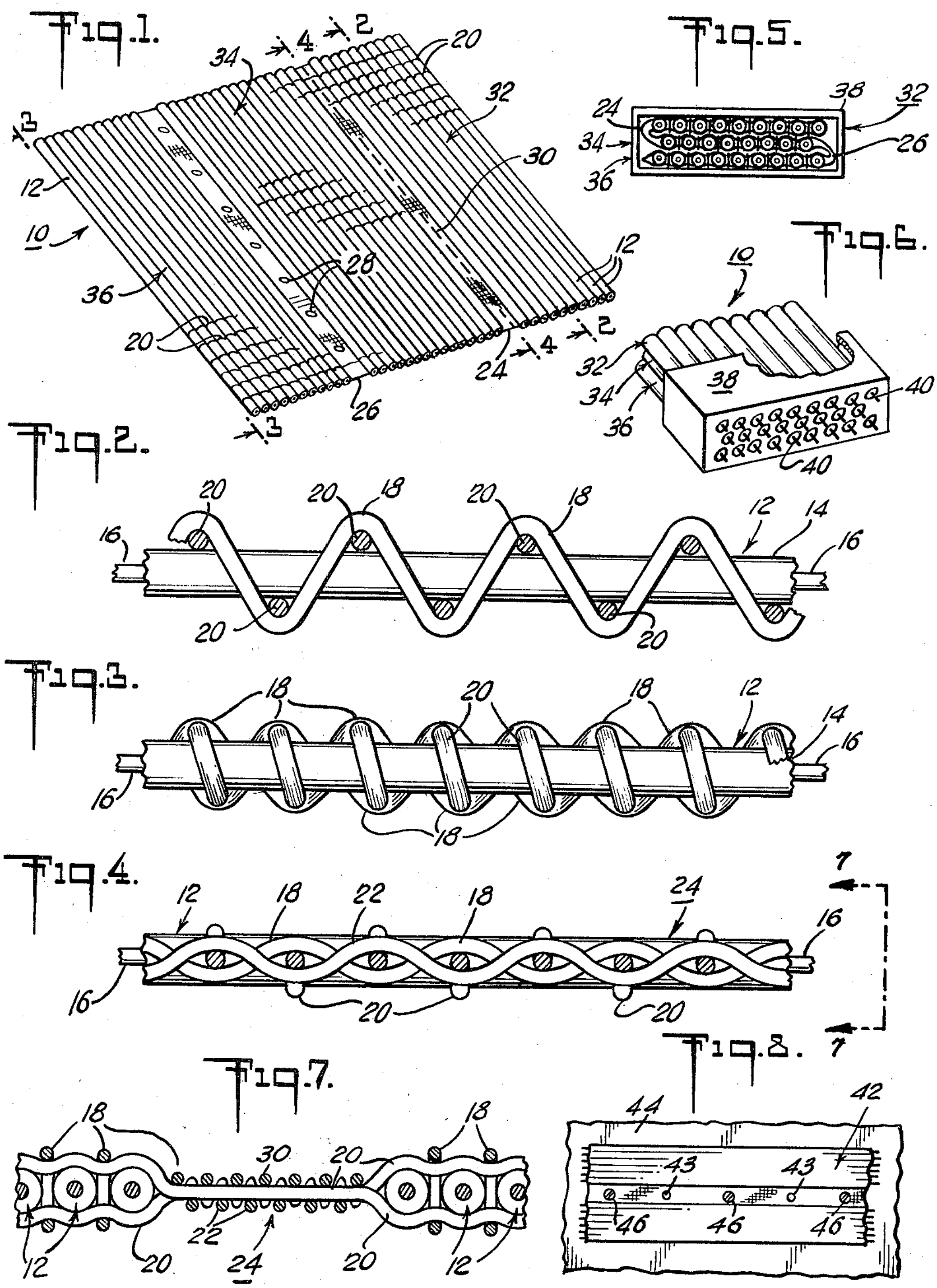
INVENTOR:
EDGAR A. ROSS
BY
Curtis, Morris & Safford
ATTORNEYS.

United States Patent Office 3,495,025

Patented Feb. 10, 1970

3,495,025

WOVEN ELECTRICAL CABLE STRUCTURE AND METHOD

Edgar A. Ross, Greenville, S.C., assignor to Southern Weaving Company, Greenville, S.C.

Filed Dec. 7, 1967, Ser. No. 688,913
Int. Cl. H01b 7/08
U.S. Cl. 174—70 13 Claims

ABSTRACT OF THE DISCLOSURE

A flat cable formed of insulated wires woven together with warp and weft threads. The wires are bound together closely except at one or more locations. At the latter locations the warp and weft threads form a cloth web joining two groups of wires. The cable can be folded along the web so as to form a multi-level woven cable, or the cable can be secured to supports for electrical equipment by means of fasteners passed through the web. In the method of the invention, insulation is stripped from selected portions of the wires by first cutting the web longitudinally in the vicinity of the portions to be stripped, pulling the severed threads to loosen the wire portions, and then stripping the insulation from the wire portions by conventional means.

This invention relates to electrical cable formed by weaving techniques, and particularly relates to flat woven cable in which the wires have coatings of insulation. This invention further relates to methods of manufacturing such cable with the insulation stripped from selected portions of the wires.

Various types of flat cable have been proposed in the past. Such prior cable includes woven cable, and molded cable with integrally-molded plastic insulation. Such prior cable usually is difficult to "strip"; that is, the construction of the cable often is such that it is difficult to remove the insulation from the ends of the wires in order to connect the wires to electrical circuitry. Furthermore, much of such prior cable is relatively difficult to mount securely in electrical assemblies and cabinets.

Accordingly, it is an object of the present invention to provide a flat cable which is relatively easy to strip, and to provide a relatively simple method of manufacturing stripped flat cable. It is another object of the present invention to provide integral means for mounting flat cable, and particularly flat woven cable, in an electrical assembly. It is a further object of the present invention to provide multi-level flat cable of relatively simple construction, and also to provide a simplified method of manufacturing such cable.

The invention which meets the foregoing objects is set forth in the following description and drawings.

In the drawings:

FIGURE 1 is a perspective view of a woven cable constructed in accordance with the present invention;

FIGURE 2 is a cross-sectional view taken along line 2—2 of FIGURE 1;

FIGURE 3 is an edge elevation view taken in the direction of line 3—3 of FIGURE 1;

FIGURE 4 is a cross-sectional view taken along line 4—4 of FIGURE 1;

FIGURE 5 is an end elevation view of another cable structure constructed in accordance with the present invention;

FIGURE 6 is a perspective, partially broken-away view of the cable structure shown in FIGURE 5;

FIGURE 7 is an end elevation view of a segment of the cable shown in FIGURE 1, and is taken in the direction indicated by the arrows 7—7 in FIGURE 4; and FIGURE 8 is an elevation view of an electrical assembly incorporating cable constructed in accordance with the present invention.

The woven cable 10 shown in FIGURE 1 includes a plurality of wires 12 each of which constitutes a round conductor 16 with a coating of insulation 14 on it (see FIGURE 2). The wires 12 are bound together in closely-spaced, substantially parallel side-by-side relationship by means of warp threads 18 and a continuous weft thread 20 (see FIGURES 2 through 4). The warp threads 18 and weft thread 20 are interwoven so as to hold the wires 12 together tightly except at locations at which webs 24 and 26 separate groups of the conductors 12 from one another. Each of the webs is formed by weaving warp and weft threads together to form a fabric joining the conductor groups. Thus, the cable 10 is separated into three separate groups 32, 34 and 36 of closely spaced wires, each group being separated from the other by a flexible web of insulating fabric. The webs 24 and 26 provide a means for folding the cable neatly and safely, for facilitating stripping of the wires, and for securing the cable in electrical assemblies.

As is shown most clearly in FIGURES 2, 3 and 7, the weft thread 20 is wrapped in spiral fashion around the outer surface of the assembled wires 12, with the thread 20 crossing over from the top to the bottom of the wires 12 at each web 24 or 26. The warp threads 18 are woven alternately over an upper portion of the thread 20, then over a lower portion, and then over another upper portion, and so forth. A single warp thread 18 is located between each pair of adjacent wires 12, as is shown in FIGURE 7.

As is shown in FIGURES 4 and 7, the web portion 24 is formed of warp threads 22 which are woven back and forth between the weft threads 20 in an alternating pattern in which the undulations of one warp thread 22 form a pattern approximately 180° out of phase with the pattern of the next thread 22, as is shown in FIGURE 4. The web 26 is identical to the web 24 except that it has a series of mounting holes 28 whose function will be described in greater detail below. Located approximately centrally in the web 24 is a thread 30 (see FIGURES 1 and 7) which preferably is of a color distinctly different from the color of the other warp threads 22 forming the web 24. For example, the color of the thread 30 is red whereas the threads 22 are white. The thread 30 is made even more readily visible by passing it over or under two weft threads 20 each time it passes through the fabric.

As is shown in FIGURE 7, successive segments of the weft thread 20 form a "criss-cross" pattern with one another at web 24 and 26. The weft thread portion **20*a* nearest to the viewer passes over the wires 12 to the left of web 24, and passes under the wires 12 to the right of web 24. The next weft thread portion 20*b* passes under the wires 12 to the left of web 24 and over the wires to the right of web 24. This "criss-cross" weft thread arrangement is highly advantageous in making the webs 24 and 26** into effective hinges which facilitate the folding of the cable longitudinally along the webs.

The width of the web 24 or 26 should be at least equal to the height of the wires 12 so that the wires adjoining the web will not bind against one another when the cable is folded along the web. Thus, if the wires have a circular cross-sectional shape, the minimum web width should be equal to the wire diameter. If, however, wire of rectangular cross-sectional shape is used, the web width should be at least as great as the thickness or height of the wire.

The threads forming the woven cable 10 preferably are made of insulating materials such as nylon and fiber glass, and other synthetic fibers sold under the trademarks "Teflon" and "Dacron." Other insulating materials, both natural and synthetic, also are suitable. Metal or other conductive threads can be used in forming a shielded cable. It is preferred that the weft threads 20 and the warp threads 18 be made of nylon, "Teflon," "Dacron" or the like, and that the warp threads 22 in the webs be made of fiber glass. The use of fiber glass threads in the webs is advantageous because the fiber glass resists being cut into by a sharp blade cutting the web longitudinally. This helps protect the wires 12 adjoining the webs from being accidentally cut by the blade.

In accordance with the method of the present invention, the line formed by the colored thread 30 in web 24, which can be termed a "strip" line, aids in separating the individual wires 12 in the cable from one another and thus aids in stripping the insulation from the ends of the wires 12 so as to provide a readily-manufactured stripped woven cable. The lower ends of the wires 12 in the wire group 32, for example, can be separated quite readily by simply inserting a knife blade through the fabric in web 24 and cutting the fabric along the "strip" line 30 longitudinally for a length approximately equal to the length of wire to be separated. Then, the ends of the weft threads 20 can be grasped and pulled outwardly and towards the lower ends of the wire 12. This pulls the binding threads off of the wires in the region in which the cut has been made, and frees the wire ends so that the wires then can be bent outwardly from the plane of the wire group for stripping. This insulation can be stripped from the wires by the use of conventional techniques such as cutting the insulation off with a knife, or by the use of mechanical wire strippers.

A significant advantage of the foregoing is that the smooth, slippery warp threads 22 on both sides of the strip line 30 guide the knife blade along the web and protect the insulation of the wires adjoining the web from being cut. This not only protects the insulation on the wires, but also allows the cable to be stripped faster than previous flat cables.

Another advantage provided by the flexible web portions 24 and 26 in the cable 10 is that the wire groups 32, 34 and 36 can be folded over upon one another to form a multi-level flat woven cable such as that shown in FIGURES 5 and 6. FIGURES 5 and 6 show the three levels 32, 34 and 36 of wire groups, and show a terminal connector 38 with terminal pins 40 which are connected to the individual wires 12 in the three levels of conductor groups 32, 34 and 36. By the simple method of folding the cable groups over onto one another, a multi-level flat cable has been provided. The cable layers may be held together either by the use of an adhesive, by merely using the terminal connectors to hold them together, or by other means.

Although the cable 10 shown in FIGURE 1 has three conductor groups 32, 34 and 36, a larger or smaller number of groups can be provided in accordance with the needs of the particular system in which the cable is to be used. For example, a two-group cable 42 is shown in FIGURE 8.

The webs 24 and 26 between wire groups not only aid in folding the cable groups onto one another and in stripping insulation from the wires, but the webs also form convenient and advantageous means for mounting the cable in electrical assemblies. Such an assembly is shown in FIGURE 8 in which a two-group woven cable 42 with holes 43 in its central web portion 45 is mounted onto a flat panel shown schematically at 44 which forms a part of an electrical assembly such as an electronic amplifier, or a computer or the like. The holes 43 are identical to the holes 28 in the web 26 shown in FIGURE 1. The holes preferably are formed by inserting a heated member through the web. This causes the thermoplastic threads in the web to melt away. When the thread has cooled, a hardened, tough fused edge is formed around each hole. Fasteners 46, illustrated in FIGURE 8 as screws, are inserted through the holes 43 in the web 45 and are screwed into the panel 44 so as to securely hold the cable 42 in place. No special brackets are required to mount the cable. The cable is flexible and can be bent to conform to the shape of oddly-shaped surfaces. Also, the provision of the flexible web 24 or 26 makes it possible to mount the cable in the corner of an electronic housing, since the cable can be bent to form a 90° angle at the web 45, and the cable can be fitted into the corner. Thus, the provision of the web makes the cable easier to handle, as well as easier to strip and mount.

The above description of the invention is intended to be illustrated and not limiting. Various changes or modifications in the embodiments described may occur to those skilled in the art and these can be made without departing from the spirit or scope of the invention as set forth in the claims.

I claim:

1. A woven cable comprising a plurality of elongated conductors, warp and weft threads interwoven with and binding said conductors together in closely-spaced, substantially parallel side-by-side relationship to one another except in at least one location at which said conductors are spaced apart by a relatively great distance, said warp and weft threads being woven together into a fabric web separating the conductors at said location, said weft threads crossing from one surface of said conductors to the other at said web, the conductors adjacent one edge of said web being folded over to overlie the conductors adjacent the other edge of said web, with said web forming the corner for the folded cable structure.

2. A cable as in claim 1 in which each of said conductors has a coating of insulation on it.

3. A cable as in claim 1 in which said web has a width at least as great as the thickness of the conductors adjoining said web.

4. A cable as in claim 1 in which each weft thread crosses from one surface of the cable to the other in a direction different from that of adjacent weft threads to form a criss-cross pattern in said web.

5. A cable as in claim 2 including a centrally-located warp thread woven into said web, said warp thread being of a color different from the other warp threads in said web.

6. An elongated flat woven cable comprising, in combination, a plurality of insulated wires arranged in a plurality of parallel, spaced-apart groups, the wires in each group being arranged parallel to and in close proximity to one another, insulating warp threads woven with an insulating weft thread wound about said cable in a spiral pattern, with the weft thread crossing from one side of the cable to the next at each spacing between adjacent wire groups and one warp thread being located between each pair of wires, the spacing between said groups being at least as great as the thickness of said wires, said weft thread being woven together with warp threads to form a web between said groups, said web containing a longitudinally-extending centrally-located visually distinct warp thread, the conductors adjacent one edge of said web being folded over to overlie the conductors adjacent the other edge of said web, with said web forming the corner for the folded cable structure.

7. An electrical assembly comprising, in combination, a member having a support surface for electrical equipment, a flat woven cable comprising a plurality of elongated conductors, warp and weft threads interwoven with and binding said conductors together in closely-spaced, substantially parallel side-by-side relationship to one another except in at least one location at which said conductors are spaced apart by a relatively great distance, said warp and weft threads being woven together into a fabric web separating the conductors at said location, and a plurality of fasteners penetrating said web and being secured to said support surface.

8. An electrical assembly as in claim 7 including holes in said web, said holes having fused rims, with said fasteners protruding through said holes.

9. A multi-level woven cable comprising a plurality of elongated conductors, warp and weft threads interwoven with and binding said conductors together in closely-spaced, substantially parallel side-by-side relationship to one another except in at least one location at which said conductors are spaced apart by a relatively great distance, said warp and weft threads being woven together into a fabric web separating the conductors at said location, the group of conductors abutting one edge of said web being folded over upon the conductors in the group abutting the other edge of said web, said weft threads crossing from one surface of said conductors to the other at said web.

10. A multi-level cable as in claim 9 including terminal connector means with multiple connector members at different levels, the connector members at each level being connected to conductors in a group at a corresponding level in said cable.

11. A method of manufacturing cable with the insulation stripped from selected portions of insulation-coated wires, said method comprising the steps of providing a woven cable comprising a plurality of elongated conductors, each being covered by a coating of insulation, warp and weft threads interwoven with and binding said conductors together in closely-spaced, substantially parallel side-by-side relationship to one another except in at least one location at which said conductors are spaced apart by a relatively great distance, said warp and weft threads being woven together into a fabric web separating the conductors at said location, severing said web longitudinally adjacent the wire portions to be stripped, pulling the severed threads to free said wire portions from the grip of the woven threads, and removing the insulation from said wire portions.

12. A method as in claim 11 in which said web has a visibly delineated longitudinal marker near its center, with a plurality of warp threads on each side of said marker separating it from said wires, and said severing step comprises guiding a cutting tool along said marker while cutting said web.

13. A woven cable comprising a plurality of elongated conductors, warp and weft threads interwoven with and binding said conductors together in closely-spaced substantially parallel side-by-side relationship to one another except in at least one location at which said conductors are spaced apart by a relatively great distance, said warp and weft threads being woven together into a fabric web separating the conductors at said location, said web having holes at intervals spaced longitudinally along said web.

References Cited

UNITED STATES PATENTS

| | | | |
|---|---|---|---|
| D. 14,451 | 11/1883 | Pond | 174—112 X |
| 2,307,690 | 1/1943 | Lee | 174—72 |

FOREIGN PATENTS

| | | |
|---|---|---|
| 3,547 | 1882 | Great Britain. |
| 15,056 | 1887 | Great Britain. |

OTHER REFERENCES

Birks, F. B.: Modern Dielectric Materials, London, Heywood & Co., 1960, pp. 230–233.

E. A. GOLDBERG, Primary Examiner

U.S. Cl. X.R.

174—72, 112, 117; 29—628